US012316163B2

(12) United States Patent
Awano et al.

(10) Patent No.: US 12,316,163 B2
(45) Date of Patent: May 27, 2025

(54) ROTARY MACHINE WITH WINDING HAVING MULTIPLE CONDUCTIVE FILMS

(71) Applicant: DENSO CORPORATION, Kariya (JP)

(72) Inventors: Naomi Awano, Kariya (JP); Junichi Naruse, Kariya (JP); Hironari Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 414 days.

(21) Appl. No.: 17/901,942

(22) Filed: Sep. 2, 2022

(65) Prior Publication Data

US 2023/0073761 A1 Mar. 9, 2023

(30) Foreign Application Priority Data

Sep. 7, 2021 (JP) ................. 2021-145517

(51) Int. Cl.
*H02K 1/14* (2006.01)
*H02K 1/02* (2006.01)
*H02K 1/2753* (2022.01)
*H02K 3/28* (2006.01)

(52) U.S. Cl.
CPC .............. *H02K 1/148* (2013.01); *H02K 1/02* (2013.01); *H02K 1/2753* (2013.01); *H02K 3/28* (2013.01)

(58) Field of Classification Search
CPC .. H02K 3/00; H02K 3/02; H02K 3/22; H02K 3/24; H02K 3/30; H02K 3/32; H02K 3/34; H02K 1/148; H02K 1/02; H02K 1/2753; H02K 3/28
USPC .................................................. 310/179, 301
See application file for complete search history.

(56) References Cited

U.S. PATENT DOCUMENTS

| 2008/0007133 | A1 | 1/2008 | Onimaru et al. |
| 2016/0276888 | A1 | 9/2016 | Dickinson |
| 2018/0323672 | A1* | 11/2018 | Juris ................. H02K 3/18 |
| 2020/0161939 | A1* | 5/2020 | Takahashi ........... H02K 17/16 |
| 2021/0151243 | A1* | 5/2021 | Neubauer ............ H01F 5/06 |

FOREIGN PATENT DOCUMENTS

| DE | 10 2008 025 694 A1 | 12/2009 |
| DE | 10 2019 220 588 A1 | 7/2021 |
| JP | H8-279311 A | 10/1996 |
| JP | 2006-100077 A | 4/2006 |

(Continued)

OTHER PUBLICATIONS

Jean-Christophe Charlier, Xavier Blase, Stephan Roche. Electronic and transport properties of nanotubes. Reviews of Modern Physics, 2007, 79 (2), pp. 677-732. ff10.1103/RevModPhys.79.677ff. ffhal03070873f (Year: 2007).*

(Continued)

*Primary Examiner* — Quyen P Leung
*Assistant Examiner* — Charlie Frank Mann, Jr.
(74) *Attorney, Agent, or Firm* — Posz Law Group, PLC

(57) ABSTRACT

A plurality of conductive films are arranged so that their thickness directions intersect with respect to a direction of a magnetic flux generated from a plurality of magnetic poles. Each of the plurality of conductive films is configured so that a conductivity in a longitudinal direction is larger than a conductivity in a thickness direction, and a conductivity in a longitudinal direction is larger than a conductivity in a width direction.

8 Claims, 12 Drawing Sheets

(56) References Cited

FOREIGN PATENT DOCUMENTS

TW 201514781 A * 4/2015 ............. G06F 3/044

OTHER PUBLICATIONS

Machine Translation of TW_201514781_A (Year: 2015).*
Kagoshima, S., Nagasawa, H., Sambongi, T. (1988). What are One-Dimensional Conductors ?. In: One-Dimensional Conductors. Springer Series in Solid-State Sciences, vol. 72. Springer, Berlin, Heidelberg. https://doi.org/10.1007/978-3-642-83179-9_1 (Year: 1988).*
Pyrhonen, Juha et al. "Replacing Copper with New Carbon Nanomaterials in Electrical Machine Windings."International Review of Electrical Engineering (I.R.E.E.), vol. 10, No. 1, Feb. 28, 2015 (Feb. 28, 2015), pp. 12-21. [retrieved on Jan. 24, 2023] URL: http://dx.doi.org/10.15866/iree.v10i1. 5253>.

* cited by examiner

ROTARY MACHINE WITH WINDING HAVING MULTIPLE CONDUCTIVE FILMS

CROSS REFERENCE TO RELATED APPLICATION

The present application is based on Japanese Patent Application No. 2021-145517 filed on Sep. 7, 2021, disclosure of which is incorporated herein by reference.

TECHNICAL FIELD

The present disclosure relates to a rotary machine.

BACKGROUND

Conventionally, an electric wire for winding is composed of a plurality of divided strands. Each of the plurality of divided strands includes a conductor core wire and an electrically insulating coating covering the conductor core wire.

SUMMARY

A rotary machine in which a winding is configured to have a plurality of conductive films is provided.

A rotary machine includes
a rotor having a plurality of magnetic poles arranged in a circumferential direction around an axis and rotatably arranged around the axis; and
a stator coil having a multi-phase winding in which an electric wire is wound for each phase, and which is arranged in a circumferential direction,
wherein
when the rotor rotates about the axis, magnetic fluxes generated from the plurality of magnetic poles generate a current in the multi-phase windings, and when a current flows through the multi-phase windings, a rotating magnetic field generated from the multi-phase windings generates a rotational force on the plurality of magnetic poles of the rotor,
when a direction in which each of the multi-phase windings extends is defined as a longitudinal direction, one of the multi-phase windings has a plurality of conductive films extending in the longitudinal direction,
when a direction of intersecting the longitudinal direction and forming a thickness of each of the plurality of conductive films is defined as a thickness direction, the plurality of conductive films are arranged in a state of being laminated in the thickness direction, and
the one winding is arranged so that the directions of magnetic flux generated from at least one of the plurality of magnetic poles intersect in the thickness direction.

DETAILED DESCRIPTION

Figure 1:
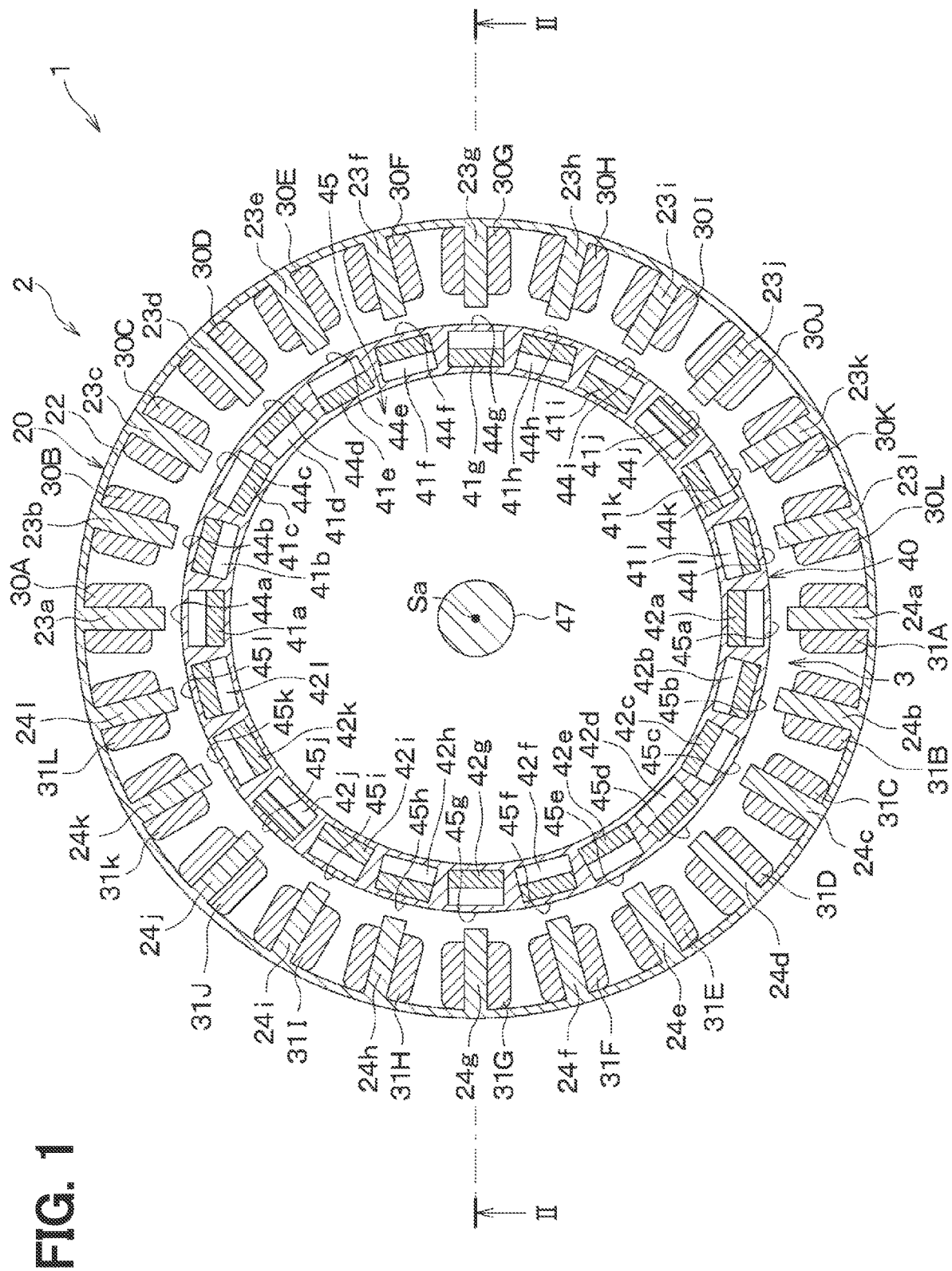
FIG. 1 is a diagram showing a cross-sectional configuration in which a rotary machine according to a first embodiment is cut along a plane orthogonal to an axis, and is a cross-sectional view to assist in explaining a plurality of teeth portions of a stator core, a plurality of windings, and a plurality of permanent magnets of a rotor.

In an assumable example, an electric wire for winding is composed of a plurality of divided strands. Each of the plurality of divided strands includes a conductor core wire and an electrically insulating coating covering the conductor core wire. Therefore, it is possible to prevent an eddy current from being generated in the cross section of the electric wire by acting on a magnetic flux generated from a magnetic pole of an electric motor.

It is described that the electric wire for winding is formed by a plurality of divided strands in order to prevent eddy currents from flowing through the electric wire.

The present discloser has studied to form a winding with a plurality of conductive films in order to suppress the generation of eddy current in a rotary machine with reference to the electric wire for winding.

In view of the above points, a rotary machine in which a winding is configured to have a plurality of conductive films is provided.

In the present disclosure, a rotary machine includes a rotor having a plurality of magnetic poles arranged in a circumferential direction around an axis and rotatably arranged around the axis; and a stator coil having a multi-phase winding in which an electric wire is wound for each phase, and which is arranged in a circumferential direction, wherein when the rotor rotates about the axis, magnetic fluxes generated from the plurality of magnetic poles generate a current in the multi-phase windings, and when a current flows through the multi-phase windings, a rotating magnetic field generated from the multi-phase windings generates a rotational force on the plurality of magnetic poles of the rotor, when a direction in which each of the multi-phase windings extends is defined as a longitudinal direction, one of the multi-phase windings has a plurality of conductive films extending in the longitudinal direction, when a direction of intersecting the longitudinal direction and forming a thickness of each of the plurality of conductive films is defined as a thickness direction, the plurality of conductive films are arranged in a state of being laminated in the thickness direction, and the one winding is arranged so that the directions of magnetic flux generated from at least one of the plurality of magnetic poles intersect in the thickness direction.

Therefore, it is possible to provide the rotary machine in which the winding is configured to have a plurality of conductive films.

Hereinafter, embodiments of present disclosure will be described with reference to the drawings. In the following embodiments, the same or equivalent parts are denoted by the same reference numerals as each other, and explanations will be provided to the same reference numerals for simplifying descriptions.

First Embodiment

Figure 2:
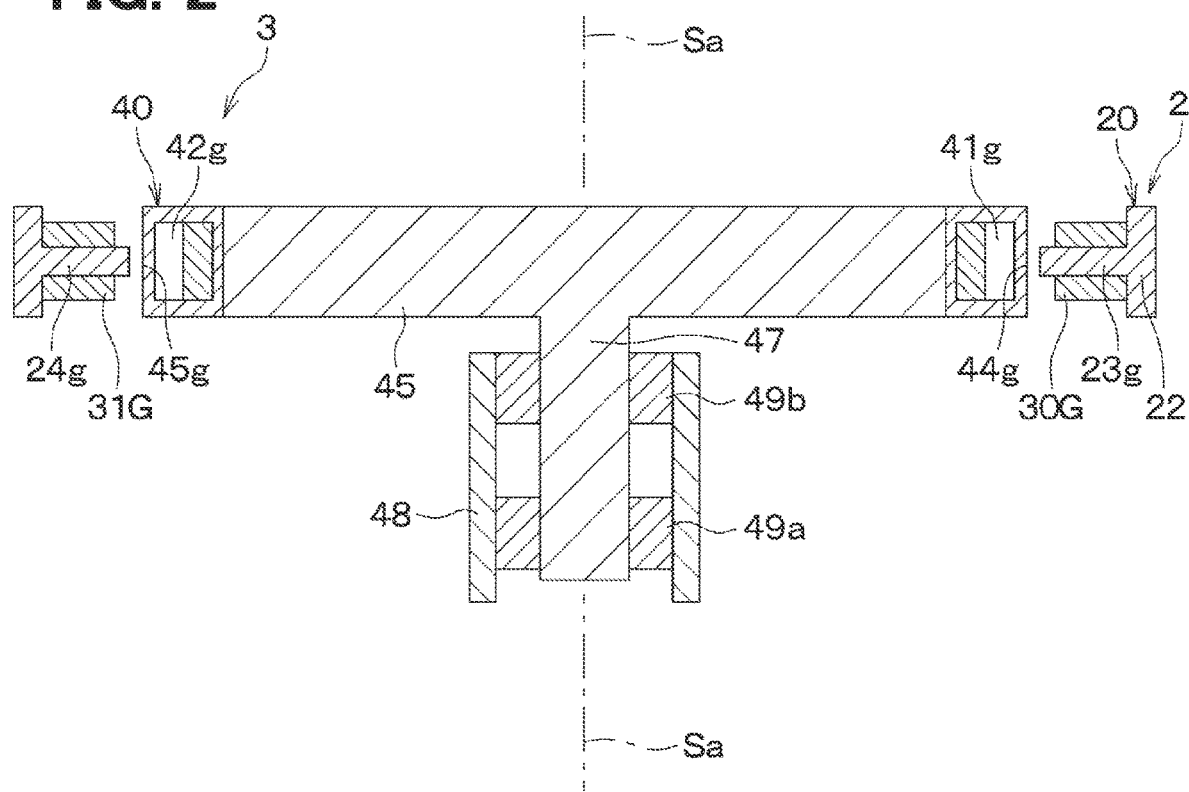
FIG. 2 is a cross-sectional view taken along a line II-II of the rotary machine of FIG. 1 to assist in explaining a plurality of teeth portions of a stator core, a plurality of windings, and a plurality of permanent magnets of a rotor.

A rotary machine 1 is a motor generator that operates as one of a motor and a generator, and includes a stator 2 and a rotor 3 as shown in FIGS. 1 and 2. The stator 2 includes a stator core 20 made of a magnetic material. The stator core 20 includes an annular portion 22 formed in an annular shape about an axis Sa.

The annular portion 22 has teeth portions 23a, 23b, 23c, 23d, 23e, 23f, 23g, 23h, 23i, 23j, 23k, 23l, 24a, 24b, 24c, 24d, 24e, 24f, 24g, 24h, 24i, 24j, 24k, and 24l.

Hereinafter, the teeth portions 23a, 23b, 23c, 23d, 23e, 23f, 23g, 23h, 23i, 23j, 23k, 23l, 24a, 24b, 24c, 24d, 24e, 24f, 24g, 24h, 24i, 24j, 24k, 24l are the teeth portions 23a to 24l.

The teeth portions 23a to 24l are formed so as to protrude inward in a radial direction about the axis Sa from the annular portion 22. The teeth portions 23a to 24l are arranged at a same interval in a circumferential direction about the axis Sa.

The teeth portions 23a, 23b, 23c, 23d, 23e, 23f, 23g, 23h, 23i, 23j, 23k, and 23l are arranged clockwise in an order in which they are described.

The teeth portions 24a, 24b, 24c, 24d, 24e, 24f, 24g, 24h, 24i, 24j, 24k, and 24l are arranged clockwise between the teeth portions 23a and 23l in the order in which they are described.

Windings 30A, 30C . . . 30K, 31A, 31C . . . 31K formed by winding formed by winding an electric wire in a forward winding direction are provided on the teeth portions 23a, 23c, 23e, 23g, 23i, 23k, 24a, 24c, 24e, 24g, 24i, 24k.

The windings 30A, 30C . . . 30K, 31A, 31C . . . 31K are described by omitting the windings 30A, 30C, 30E, 30G, 30I, 30K, 31A, 31C, 31E, 31G, 31I, and 31K.

Windings 30B, 30D . . . 30L, 31B, 31D . . . 31L formed by winding formed by winding an electric wire in a reverse winding direction are provided on the teeth portions 23b, 23d, 23f, 23h, 23j, 23l, 24b, 24d, 24f, 24h, 24j, 24l. The windings 30B, 30D . . . 30L, 31B, 31D . . . 31L are described by omitting the windings 30B, 30D, 30F, 30H, 30J, 30L, 31B, 31D, 31F, 31H, 31J, 31L.

In the present embodiment, a clockwise direction from a base side of the teeth portion (that is, the annular portion 22 side) toward a tip end portion of the teeth portion is referred to as a normal winding direction. A counterclockwise direction from the base side of the teeth portion toward the tip end portion of the teeth portion is referred to as a reverse winding direction opposite to the normal winding direction.

The electric wire 50 constituting the windings 30A, 30C . . . 30K, 31A, 31C . . . 31K of the present embodiment is composed of a plurality of conductive films 51. The electric wire 50 constituting the windings 30B, 30D . . . 30L, 31B, 31D . . . 31L is composed of a plurality of conductive films 51. The structure of the electric wire 50 will be described later.

Figure 3:
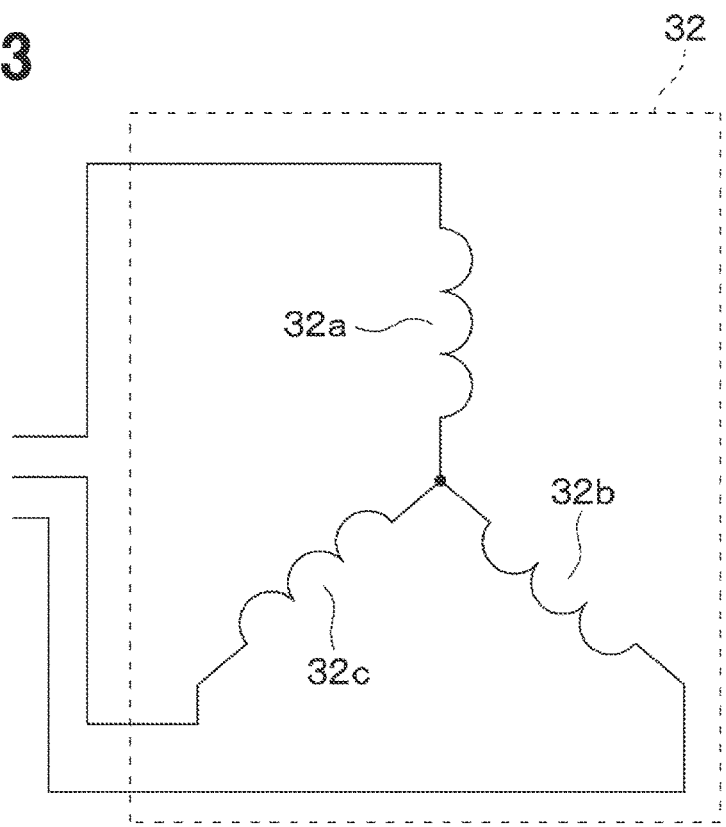
FIG. 3 is a diagram showing a stator coil constituting a plurality of windings of the rotary machine of FIG. 1, and is a diagram for assisting in explaining the plurality of windings.

The windings 30A, 30B, 30G, 30H, 31A, 31B, 31G, 31H are connected in series to form an U-phase winding 32a shown in FIG. 3. The windings 30C, 30D, 30I, 30J, 31C, 31D, 31I, 31J are connected in series to form an V-phase winding 32b shown in FIG. 3. The windings 30E, 30F, 30K, 30L, 31E, 31F, 31K, 31L are connected in series to form a W-phase winding 32c shown in FIG. 3.

As described above, the U-phase winding 32a, the V-phase winding 32b, and the W-phase winding 32c are star-connected as shown in FIG. 3 to form a three-phase (that is, multi-phase) stator coil 32.

The rotor 3 of FIG. 1 includes a rotor core 40, permanent magnets 41a to 41l and 42a to 42l, a disk portion 45, and a rotary shaft 47.

The permanent magnets 41a to 41l are described by omitting the permanent magnets 41a, 41b, 41c, 41d, 41e, 41f, 41g, 41h, 41i, 41j, 41k, 41l Permanent magnets 42a to 42l are described by omitting the permanent magnets 42a, 42b, 42c, 42d, 42e, 42f, 42g, 42h, 42i, 42j, 42k, 42l.

The rotor core 40 is formed of a magnetic material in an annular shape centered on the axis Sa. The rotor core 40 is supported so as to be rotatable in a circumferential direction about the axis Sa. Each of the permanent magnets 41a to 41l and 42a to 42l is housed in the rotor core 40.

The permanent magnets 41a to 41l and 42a to 42l are arranged clockwise in the circumferential direction about the axis Sa in the order of description thereof.

Each of the permanent magnets 41a to 41l and 42a to 42l forms each of the magnetic poles 44a to 44l and 45a to 45l that generate magnetic flux with respect to the windings 30A to 30L and 31A to 31L.

The magnetic poles 44a to 44l are described by omitting the magnetic poles 44a, 44b, 44c, 44d, 44e, 44f, 44g, 44h, 44i, 44j, 44k, 44l The magnetic poles 45a to 45l are described by omitting the magnetic poles 45a, 45b, 45c, 45d, 45e, 45f, 45g, 45h, 45i, 45j, 45k, 45l.

The magnetic poles 44a to 44l and 45a to 45l are formed on an outer side in a radial direction about the axis Sa in the rotor core 40. The magnetic poles 44a to 44l and 45a to 45l are arranged in the circumferential direction about the axis Sa.

Of the permanent magnets 41a to 41l and 42a to 42l, the permanent magnet on one side of the two permanent magnets adjacent to each other in the circumferential direction centered on the axis Sa has a S pole arranged on an outer side in the radial direction and a N pole arranged on an inner side in the radial direction. Of the above two permanent magnets, the other permanent magnet other than the permanent magnet on one side has the N pole arranged on the outer side in the radial direction and the S pole arranged on the inner side in the radial direction.

Specifically, each of the permanent magnets 41a, 41c, 41e, 41g, 41i, 41k, 42a, 42c, 42e, 42g, 42i, 42k has the S pole arranged on the outer side in the radial direction centered on the axis Sa and the N pole arranged on the inner side in the radial direction centered on the axis Sa.

Each of the permanent magnets 41b, 41d, 41f, 41h, 41j, 41l, 42b, 42d, 42f, 42h, 42j, 42l has the N pole arranged on the outer side in the radial direction centered on the axis Sa, and the S pole arranged on the inner side in the radial direction centered on the axis Sa.

Of the permanent magnets 41a to 41l and 42a to 42l in FIG. 1, the part where a hatching of the diagonal line is described indicates the N pole. Of the permanent magnets 41a to 41l and 42a to 42l, the part described in white indicates the S pole.

Further, the disk portion 45 of the rotor 3 is formed in a disk shape centered on the axis Sa by a magnetic material, and is fitted into a hollow portion of the rotor core 40. As a result, the disk portion 45 supports the rotor core 40.

The rotary shaft 47 is formed in a columnar shape centered on the axis Sa. The rotary shaft 47 is formed so as to extend from the disk portion 45 to one side in the axial direction. The axis direction is the direction in which the axis Sa extends.

The rotary shaft 47 is rotatably supported by a rotor housing 48 via bearings 49a and 49b. As a result, the rotor 3 is rotatably supported by the bearings 49a and 49b. The bearings 49a and 49b are arranged on the outer side in the radial direction about the axial direction with respect to the rotary shaft 47. The bearings 49a and 49b are arranged so as to be offset from each other in the axial direction.

The rotor housing 48 is arranged in a cylindrical shape centered in the axial direction. The rotor housing 48 is arranged on the outer side in the radial direction about the axial direction with respect to the bearings 49a and 49b. Next, the structure of the electric wire of the present embodiment will be described with reference to FIGS. 4, 5, and 6.

Figure 4:
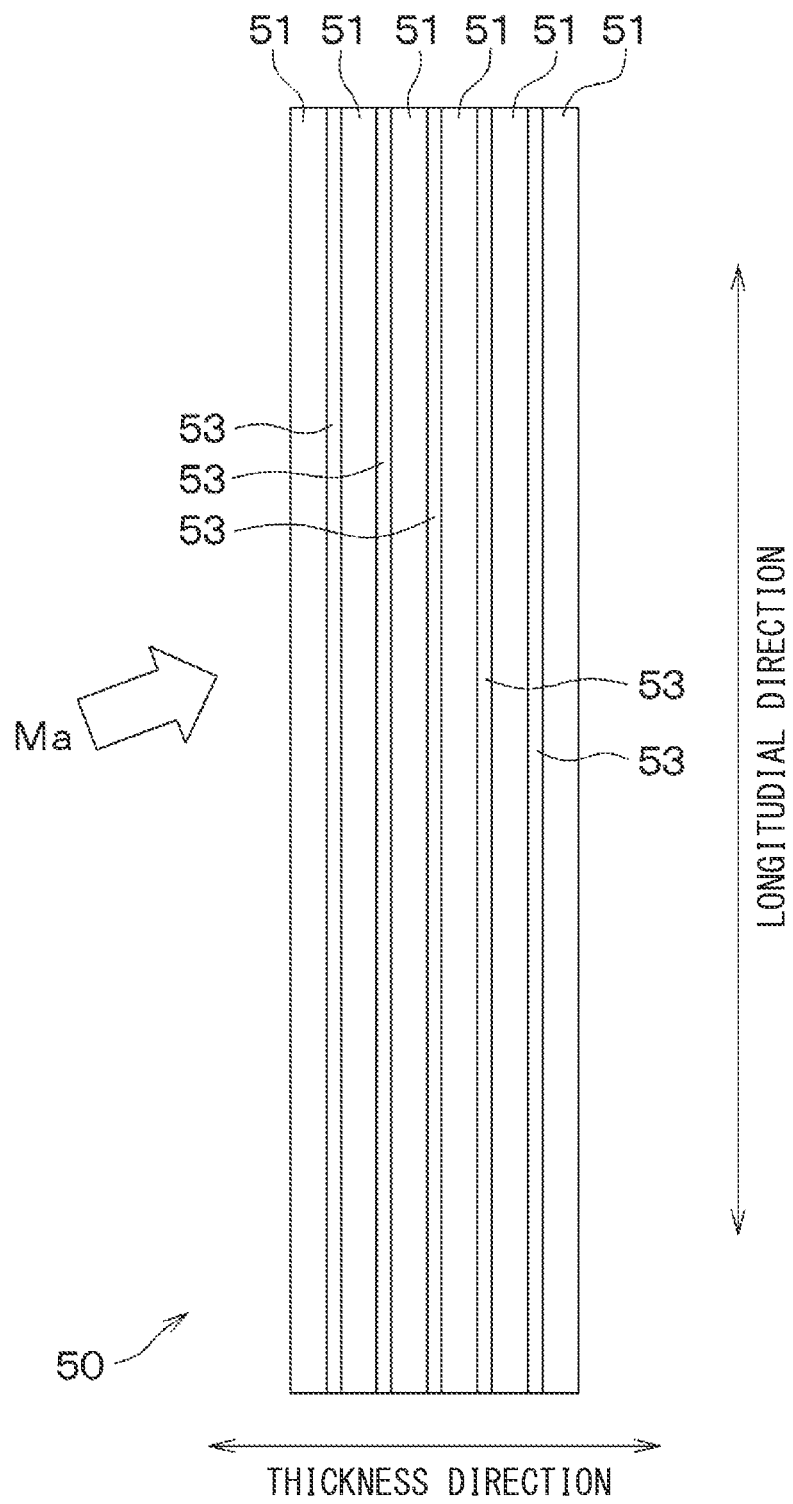
FIG. 4 is a front view showing a structure of the electric wire constituting the winding of FIG. 1, and is a diagram for assisting in explaining an arrangement relationship between a conductive film constituting the electric wire and an insulating layer.

As shown in FIG. 4, the electric wire 50 of the present embodiment is a film laminated wire provided with a plurality of conductive films 51 and a plurality of insulating layers 53. The plurality of conductive films 51 are films having conductivity and flexibility, respectively. Each of the plurality of conductive films 51 is formed so as to extend in a longitudinal direction of the electric wire 50. The longitudinal direction of the electric wire 50 indicates an energizing direction of the drive current.

The plurality of conductive films 51 are laminated, respectively. The plurality of conductive films 51 are formed so that their respective longitudinal directions are aligned. The conductive film 51 is arranged so that their respective width directions are aligned.

Figure 5:
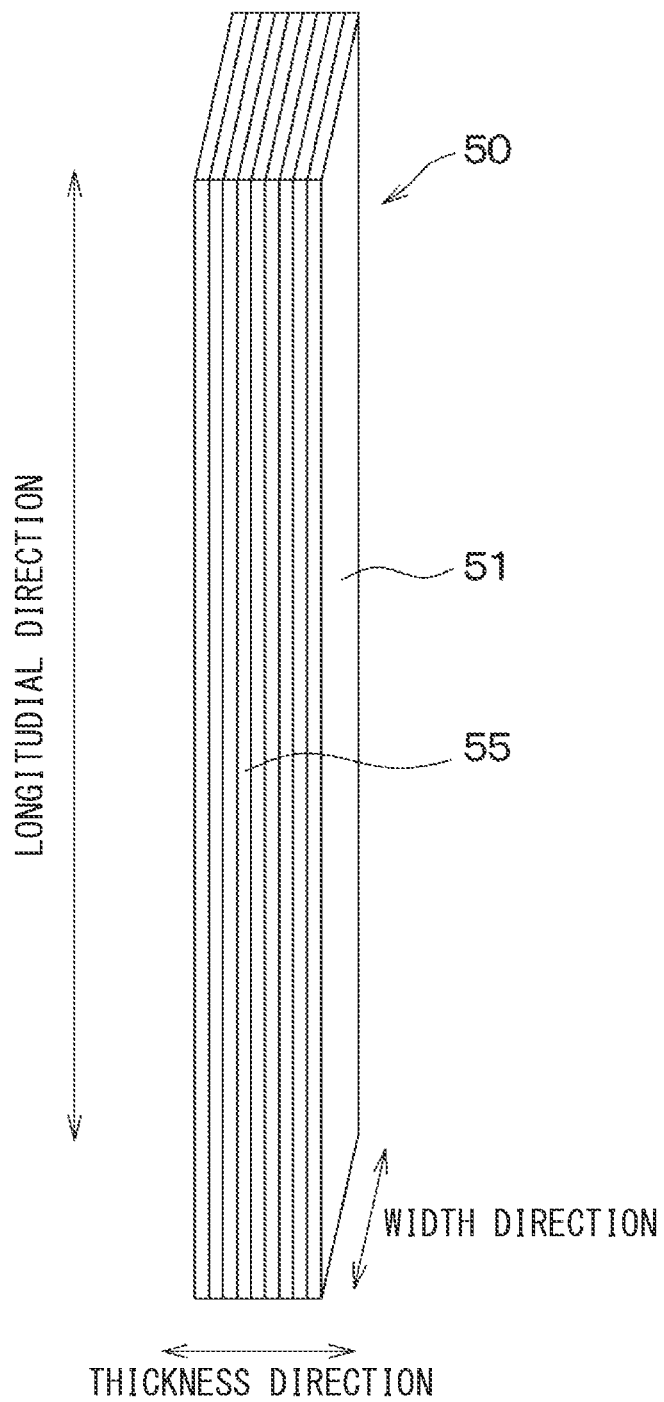
FIG. 5 is a perspective view showing the structure of the electric wire constituting the winding of FIG. 1, and is a diagram for assisting in explaining a longitudinal direction, a thickness direction, and a width direction of the electric wire and the conductive film.

Here, as shown in FIG. 5, the longitudinal direction is a direction in which the electric wire 50 and the plurality of conductive films 51 extend, and the thickness direction is a direction in which each of the plurality of conductive films 51 intersects the longitudinal direction and forms a thickness. Specifically, the thickness direction is a direction orthogonal to the longitudinal direction and forming a thickness in each of the plurality of conductive films 51.

In the plurality of conductive films 51, the width direction intersects the thickness direction and intersects the longitudinal direction. Specifically, in the plurality of conductive films 51, the width direction is orthogonal to the thickness direction and orthogonal to the longitudinal direction.

The plurality of insulating layers 53 are laminated together with the plurality of conductive films 51 in the thickness direction. Specifically, the plurality of insulating layers 53 and the plurality of conductive films 51 are alternately arranged one by one in the thickness direction. Here, each of the plurality of insulating layers 53 is formed into a thin film by an electrically insulating resin material.

In the present embodiment, each of the plurality of insulating layers 53 is formed by impregnating one surface of each of the plurality of conductive films 51 in the thickness direction with an electrically insulating resin material. As a result, the electric wire 50 is formed by laminating the plurality of conductive films 51 and the plurality of insulating layers 53. As will be described later, the plurality of insulating layers 53 play a role of suppressing a generation of eddy currents in the electric wire 50.

In the present embodiment, as the plurality of insulating layers 53, an electrically insulating film made of an electrically insulating material is used. The electrically insulating film is a film having electrical insulation and flexibility. As an electrically insulating resin material constituting the electrically insulating film, for example, polymethylmethacrylate resin, polypropylene, polyethylene, monomer cast nylon, duracon (TM), polycarbonate and the like can be used.

In the present embodiment, each of the plurality of conductive films 51 includes a plurality of carbon nanotubes. The plurality of carbon nanotubes are arranged so that their respective extending directions Es are along the longitudinal direction of the electric wire 50.

Figure 6:
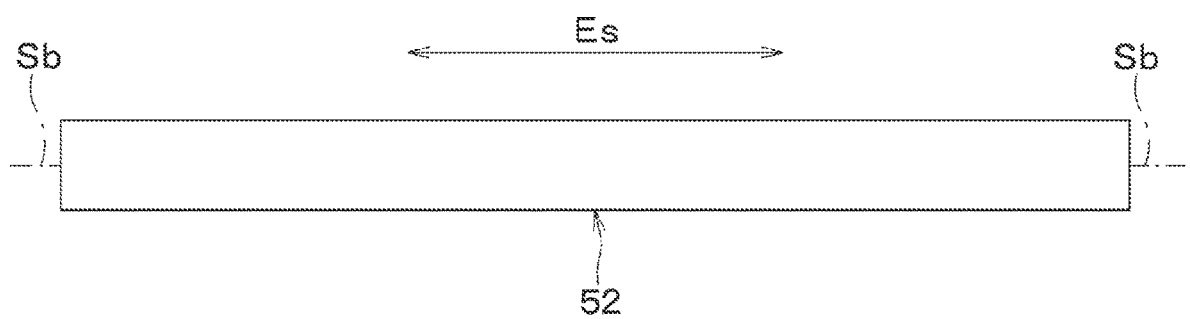
FIG. 6 is a front view of a carbon nanotubes constituting the conductive film of FIG. 4 as viewed from an outside in a radial direction thereof, and is a diagram for assisting in explaining an extending direction of the carbon nanotubes.
Figure 7:
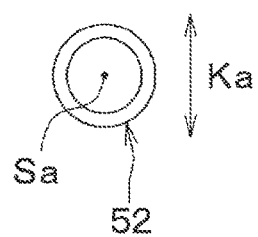
FIG. 7 is a view of an end of the carbon nanotube of FIG. 6 on one side in the extending direction as viewed from one side in the extending direction.

As shown in FIGS. 6 and 7, the extension direction Es is a direction orthogonal to a radial direction Ka of the carbon nanotube 52. That is, the extension direction Es is the direction in which the axis Sb of the carbon nanotube 52 extends. Therefore, the extension directions Es of each of the plurality of carbon nanotubes coincide with the longitudinal direction of the electric wire 50.

Since the plurality of conductive films 51 are configured in this way, in each of the plurality of conductive films 51, the conductivity thereof in the longitudinal direction is larger than the conductivity thereof in the thickness direction, and the conductivity thereof in the longitudinal direction is larger than the conductivity thereof in the width direction.

That is, in each of the plurality of conductive films 51, the conductivity in the thickness direction is smaller than the conductivity in the longitudinal direction, and the conductivity in the width direction is smaller than the conductivity in the longitudinal direction.

By using the anisotropy of the conductivity in the plurality of conductive films 51, the effect of forming electrical insulation on the surfaces of the plurality of conductive films 51 can be expected.

The electric wire 50 of the present embodiment is arranged in a state in which sixty (60) sheets of conductive films 51 having a thickness direction dimension of 20 μm and a width direction dimension of 8 mm are laminated.

Figure 8:
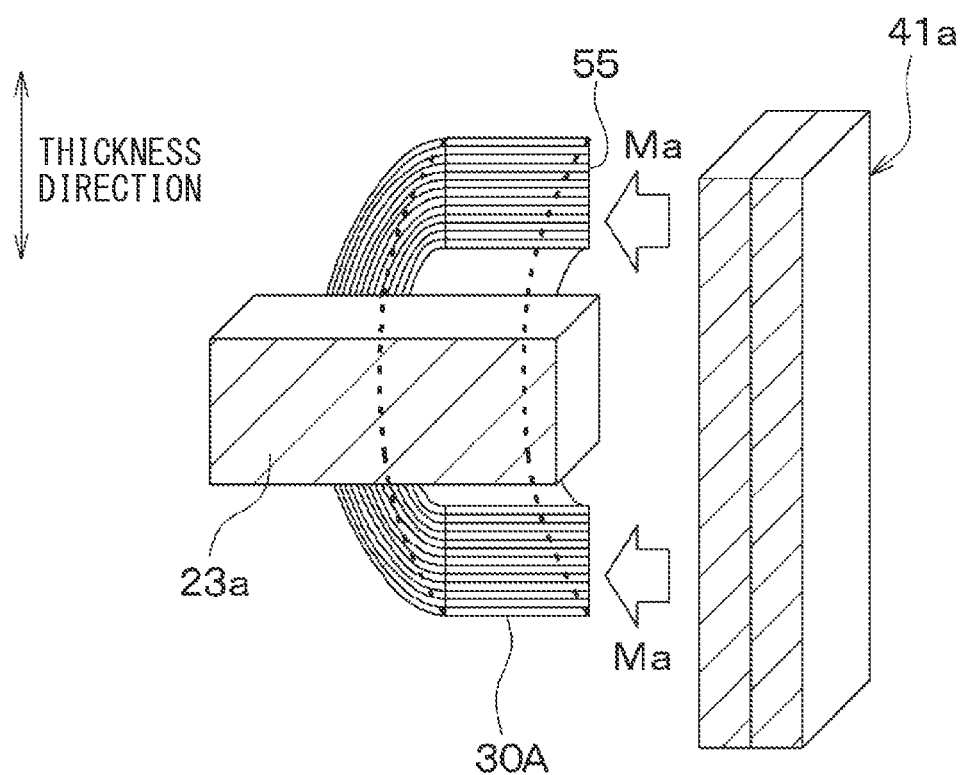
FIG. 8 is a cross-sectional view of the winding, the teeth portion, and permanent magnet of the stator of FIG. 1 cut along a plane extending in the radial direction including the axis of the teeth portion, and is a diagram for explaining a relationship between a thickness direction of the conductive film and a direction of magnetic flux.

In the present embodiment, as shown in FIG. 8, the windings 30A to 30L and 31A to 31L are arranged that the directions of the magnetic flux Ma generated from the permanent magnets 41a to 41l and 42a to 42l intersect in the thickness direction of the conductive film 51.

Here, the surface of the electric wire 50 formed on one side or the other side in the width direction and extending in the longitudinal direction is referred to as a thickness surface 55 as shown in FIGS. 5 and 8. The windings 30A to 30L and 31A to 31L are arranged so that each of their respective thickness surfaces 55 intersect in the direction of the magnetic flux Ma generated from the permanent magnets 41a to 41l and 42a to 42l.

FIG. 8 is a cross-sectional view of one winding 30A, a permanent magnet 41a, and teeth portions 23a cut along a plane extending in the radial direction centered on the axis Sa including the axis Sa. FIG. 8 shows a schematic diagram of a one winding 30A for convenience of explanation, but in reality, a plurality of windings are adopted as the winding 30A.

Next, the operation of the rotary machine 1 of the present embodiment will be described.

First, in a case where the rotary machine 1 operates as a motor, when a three-phase alternating current as a drive current flows from an inverter circuit (not shown) to the stator coil 32, a rotating magnetic field is generated in the windings 30A to 30L and 31A to 31L.

The windings 30A to 30L are described by omitting the windings 30A, 30B, 30C, 30D, 30E, 30F, 30G, 30H, 30I, 30J, 30K, and 30L. The windings 31A to 31L are described by omitting the windings 31A, 31B, 31C, 31D, 31E, 31F, 31G, 31H, 31I, 31J, 31K and 31L.

The rotating magnetic field is a magnetic field that rotates around the axis Sa in the windings 30A to 30L and 31A to 31L. Therefore, the magnetic poles 44a to 44l and 45a to 45l of the rotor 3 generate a rotational force that rotates by the rotating magnetic field generated from the windings 30A to 30L and 31A to 31L. Therefore, the rotor 3 rotates and the rotational force of the rotor 3 is output from the rotary shaft 47.

The magnetic poles 44a to 44l are described by omitting the magnetic poles 44a, 44b, 44c, 44d, 44e, 44f, 44g, 44h, 44i, 44j, 44k, and 44l. The magnetic poles 45a to 45l are described by omitting the magnetic poles 45a, 45b, 45c, 45d, 45e, 45f, 45g, 45h, 45i, 45j, 45k, and 45l.

On the other hand, in a case where the rotary machine 1 operates as a generator, a rotational force is applied to the rotary shaft 47 from the outside, and the rotor 3 rotates. At this time, a three-phase alternating current can be generated in the windings 30A to 30L and 31A to 31L by the magnetic flux generated from the magnetic poles 44a to 44l and 45a to 45l. As a result, three-phase AC power can be output from the windings 30A to 30L and 31A to 31L.

Here, when the rotary machine 1 operates as one of the three-phase AC motor and the three-phase AC generator, the magnetic flux generated from the plurality of magnetic poles 44a to 44l and 45a to 45l of the rotor 3 passes through the plurality of conductive films 51 constituting the windings 30A to 30L and 31A to 31L.

In the present embodiment, as described above, the plurality of conductive films 51 are arranged so that the directions of the magnetic flux Ma generated from the magnetic poles 44a to 44l and 45a to 45l intersect in the respective thickness directions of the conductive films 51.

As described above, the plurality of insulating layers 53 and the plurality of conductive films 51 are alternately arranged one by one in the thickness direction. Therefore, the plurality of insulating layers 53h can suppress the generation of eddy currents in the plurality of conductive films 51 due to the magnetic fluxes generated from the magnetic poles 44a to 44l and 45a to 45l. That is, even if the magnetic flux passing through the plurality of conductive films 51 changes, the plurality of insulating layers 53h can suppress the generation of eddy currents in the plurality of conductive films 51.

Further, as described above, in each of the plurality of conductive films 51, the conductivity in the longitudinal direction is larger than the conductivity in the thickness direction, and the conductivity in the longitudinal direction is larger than the conductivity in the width direction.

Therefore, in the plurality of conductive films 51, it is possible to suppress the generation of eddy currents in the thickness direction and the width direction due to the magnetic fluxes generated from the magnetic poles 44a to 44l and 45a to 45l. That is, even if the magnetic flux passing through the plurality of conductive films 51 changes, it is possible to suppress the generation of eddy currents in the thickness direction and the width direction by the plurality of conductive films 51 themselves.

The present discloser has studied in the rotary machine 1 that windings 30A to 30L and 31A to 31L are formed by electric wires 50 including a plurality of conductive films 51 made of carbon nanotubes 52 so as to suppress the occurrence of eddy current loss.

Therefore, according to the present embodiment described above, the rotary machine 1 has magnetic poles 44a to 44l and 45a to 45l arranged in the circumferential direction centered on the axis Sa, and the rotor 3 rotatably configured centered on the axis Sa.

The rotary machine 1 includes three-phase windings 30A to 30L and 31A to 31L in which the electric wire 50 is wound for each phase, and the stator coils 32 in which windings 30A to 30L and 31A to 31L are arranged in the circumferential direction and in the radial direction centered on the axis Sa with respect to the rotor 3.

When an alternating current flows through the three-phase windings 30A to 30L and 31A to 31L, the rotating magnetic field generated from the three-phase windings 30A to 30L and 31A to 31L causes rotational force to the magnetic poles 44a to 44l and 45a to 45l of the rotor 3.

The electric wire 50 includes a plurality of conductive films 51, and the electric wires 50 are formed so as to extend in the longitudinal direction by arranging the plurality of conductive films 51 in a laminated state so as to extend in the longitudinal direction.

The plurality of conductive films 51 are arranged so that the directions of the magnetic flux Ma generated from the plurality of magnetic poles 44a to 44l and 45a to 45l intersect in the respective thickness directions.

The plurality of conductive films 51 includes a plurality of carbon nanotubes, respectively. The extension direction Es of each of the plurality of carbon nanotubes coincide with the longitudinal direction of the electric wire 50. In this configuration, each of the plurality of conductive films 51 has a higher conductivity in the longitudinal direction than the conductivity in the thickness direction, and a higher conductivity in the longitudinal direction than the conductivity in the width direction.

Therefore, in the plurality of conductive films 51, the conductivity in the thickness direction and the conductivity in the width direction are smaller than the conductivity in the longitudinal direction. Therefore, when the magnetic flux generated from the magnetic poles 44a to 44l and 45a to 45l passes through the plurality of conductive films 51, it is possible to suppress the flow of eddy currents in the thickness direction or the width direction in the plurality of conductive films 51.

As described above, it is possible to provide the rotary machine 1 in which the eddy current is suppressed from flowing through the three-phase windings 30A to 30L and 31A to 31L.

In the present embodiment configured as described above, a following effect (A) can be obtained.

(A) The plurality of insulating layers 53 and the plurality of conductive films 51 are alternately arranged one by one in the thickness direction. Therefore, in the plurality of conductive films 51, it is possible to further suppress the flow of eddy currents in the thickness direction. As a result, it is possible to further suppress the flow of eddy currents in the three-phase windings 30A to 30L and 31A to 31L (that is, the U-phase winding 32a, the V-phase winding 32b, and the W-phase winding 32c).

Next, the results obtained by simulation of the eddy current loss that occurs when a copper square wire 50A, a copper dividing wire 50B, and a film laminated wire 50C are used as electric wires will be described with reference to FIGS. 9, 10, and 11.

Figure 9:
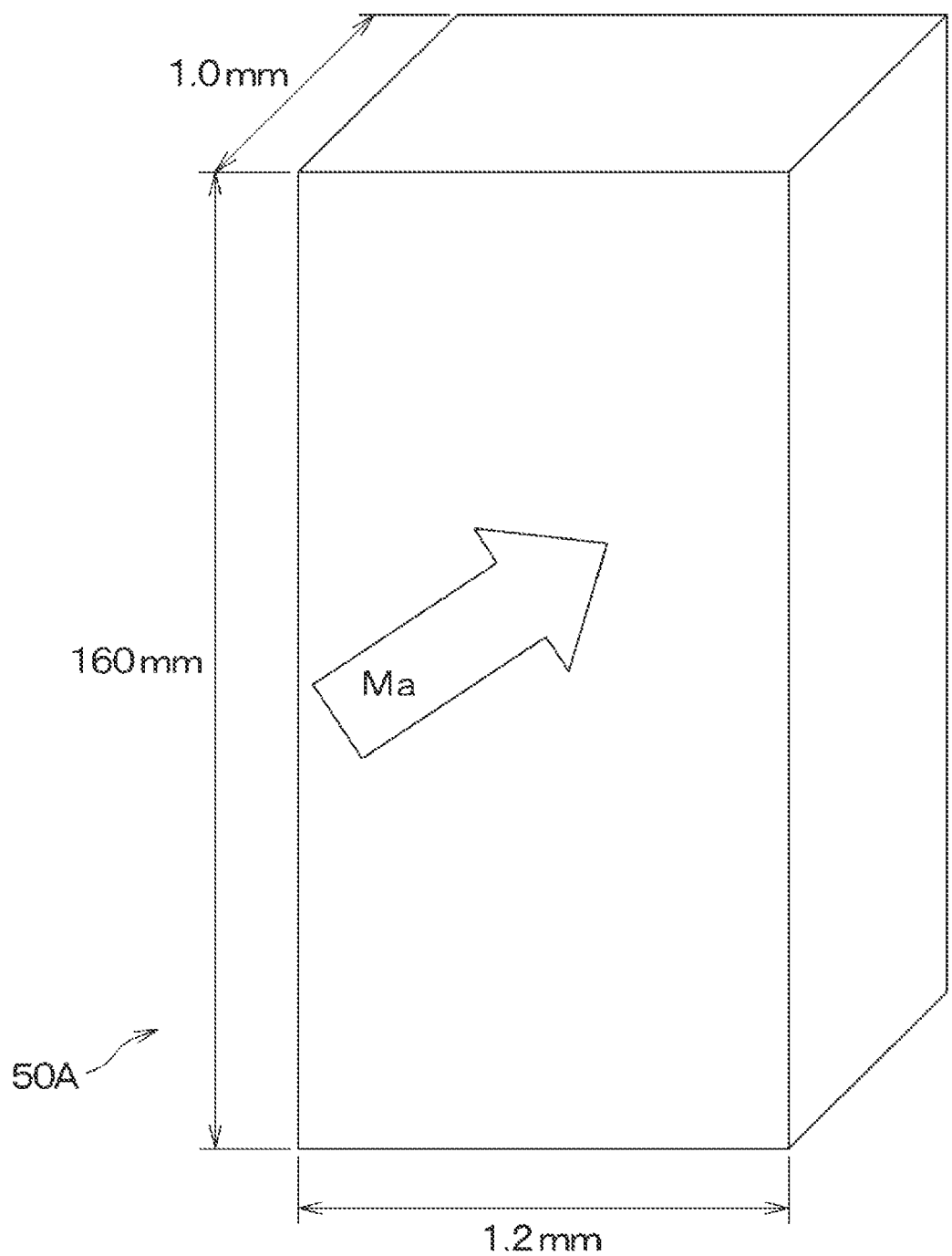
FIG. 9 is a perspective view showing the structure of a copper square wire to be simulated for comparison with the eddy current loss of the electric wire of the first embodiment.

FIG. 9 shows an example in which a magnetic flux Ma is applied to the copper square wire 50A. As shown in FIG. 9, the copper square wire 50A is an electric wire made of copper square bar having a length in the thickness direction of 1.2 mm, a length in the width direction of 1.0 mm, and a length in the longitudinal direction of 160 mm.

Figure 10:
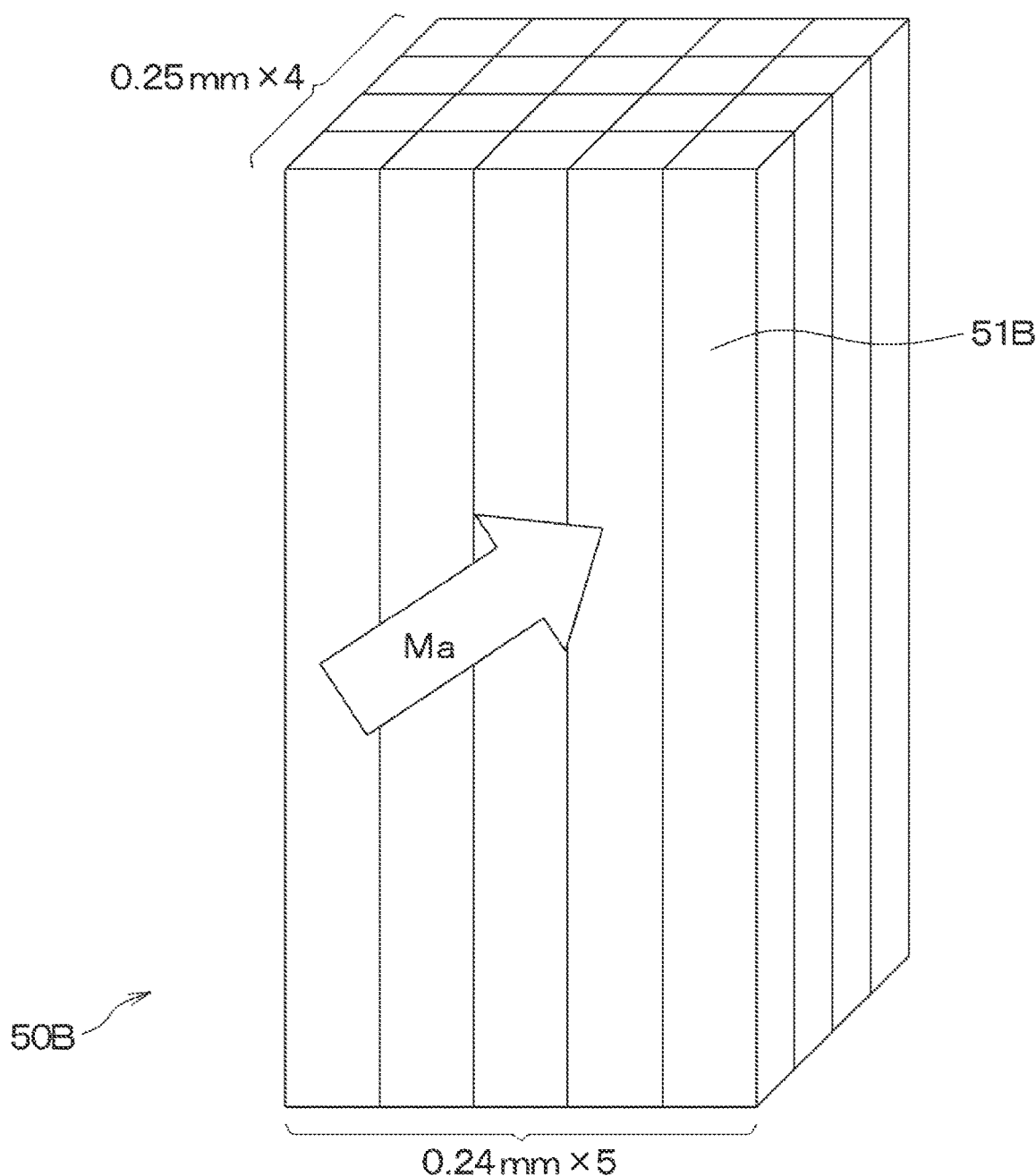
FIG. 10 is a perspective view showing the structure of a copper dividing wire to be simulated for comparison with the eddy current loss of the electric wire of the first embodiment.

FIG. 10 shows an example in which the magnetic flux Ma is applied to the copper dividing wire 50B. As shown in FIG. 10, the copper dividing wire 50B has a length in a thickness direction of 0.24 mm, a length in a width direction of 0.25 mm, and a length in a longitudinal direction of 160 mm, and twenty (20) copper dividing wires 51B are arranged side by side to form a prismatic structure. In the copper dividing wire 50B of FIG. 10, five (5) copper dividing wires 51B are arranged in the thickness direction and four (4) copper dividing wires are arranged in the width direction.

Figure 11:
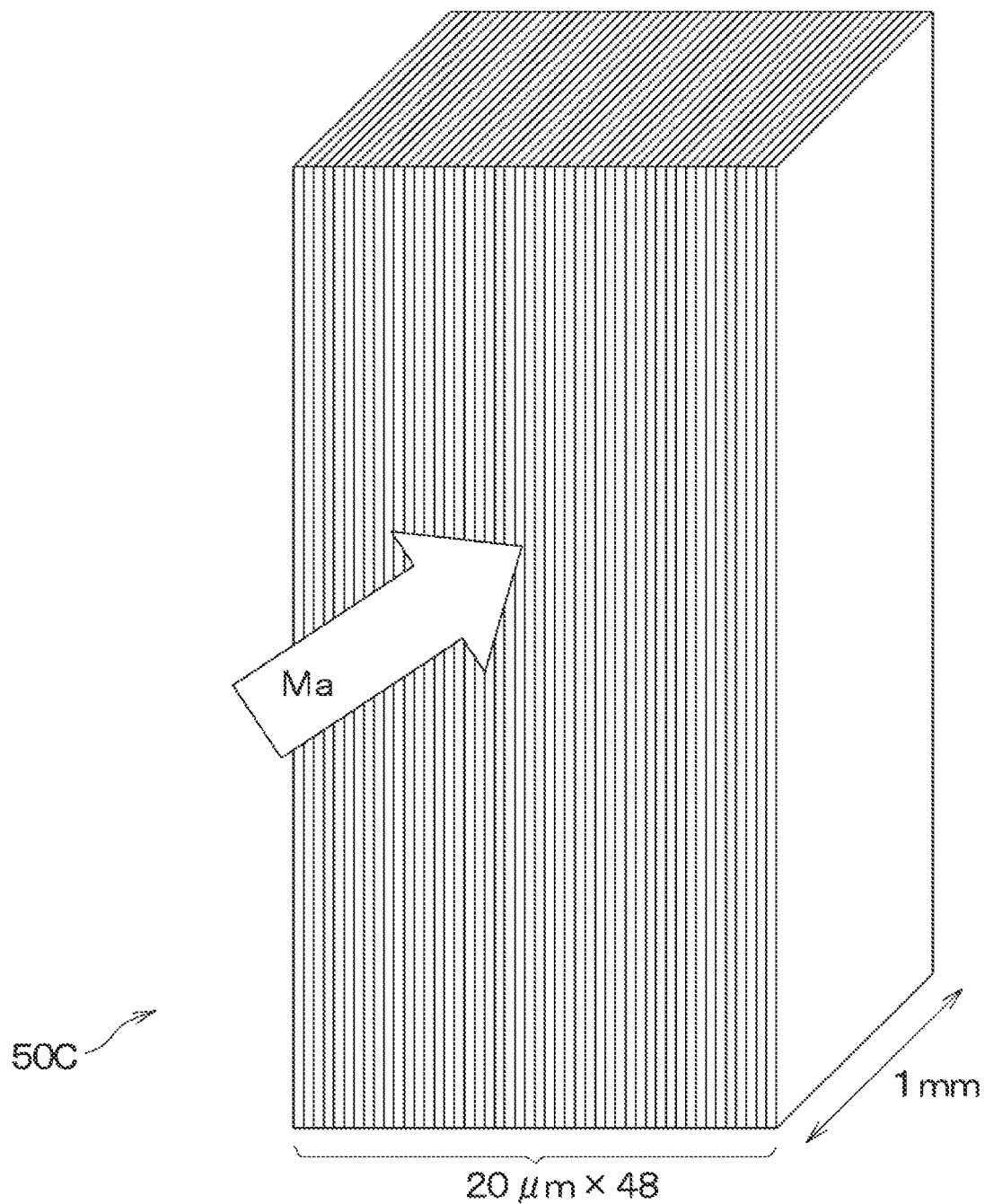
FIG. 11 is a perspective view showing a film laminated wire to be simulated for obtaining an eddy current loss of the electric wire of the first embodiment.

FIG. 11 shows an example in which the magnetic flux Ma is applied to the film laminated wire 50C. As shown in FIG. 11, in the film laminated wire 50C, a plurality of conductive films having a length in a thickness direction of 20 μm, a length in a width direction of 1 mm, and a length of a longitudinal direction of 160 mm are laminated in the same manner as the electric wire 50 of the present embodiment. Similar to the conductive film 51 of the present embodiment, the plurality of conductive films are arranged so that the extending direction of the plurality of carbon nanotubes is along the longitudinal direction.

Here, according to a simulation result for obtaining the eddy current loss generated in the copper square wire 50A, the copper dividing wire 50B, and the film laminated wire 50C, the eddy current loss generated in the copper dividing wire 50B is 3.84, assuming that the eddy current loss generated in the copper square wire 50A is 100. Further, the eddy current loss generated in the film laminated wire 50C is 0.04.

From the above description, by using the film laminated wire 50C (that is, the electric wire 50 of the present embodiment), the eddy current loss is smaller than that of the copper square wire 50A or the copper dividing wire 50B.

Second Embodiment

In the first embodiment, an example in which the electric wire 50 is composed of a plurality of conductive films 51 including carbon nanotubes has been described. However, instead of this configuration, the second embodiment in which the electric wire 50 is composed of a plurality of conductive films 51D made of a metal material will be described with reference to FIG. 12.

The electric wire 50 of the present embodiment includes a plurality of conductive films 51D instead of the plurality of conductive films 51 in the electric wire 50 of the first embodiment. Each of the plurality of conductive films 51D is formed in a thin film shape by a conductive metal material such as copper, aluminum, iron, and so on.

Figure 12:
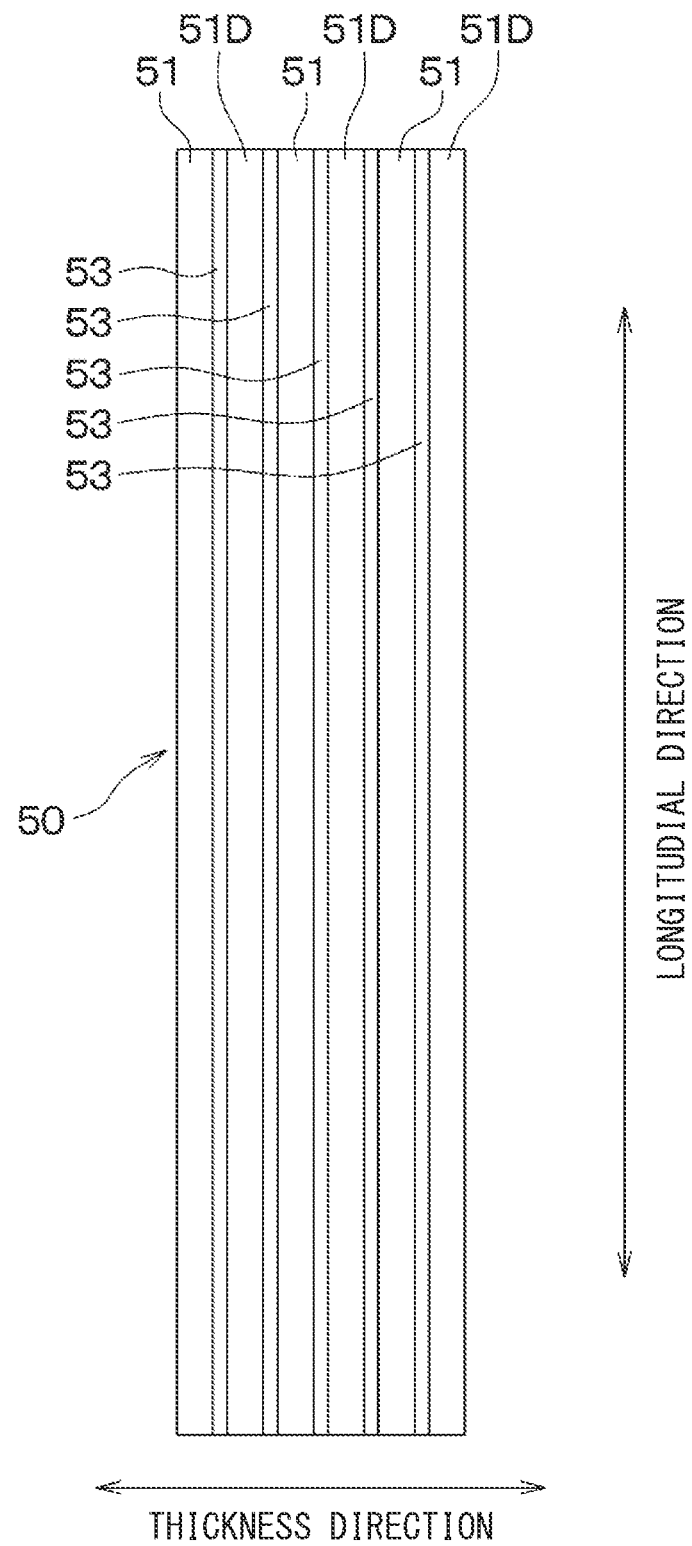
FIG. 12 is a front view showing the structure of an electric wire constituting the winding of a second embodiment, and is a diagram for assisting in explaining an arrangement relationship between the conductive film constituting the plurality of windings and the insulating layer.

The electric wire 50 of the present embodiment includes a plurality of insulating layers 53, similarly to the electric wire 50 of the first embodiment. As shown in FIG. 12, the plurality of insulating layers 53 are alternately arranged one by one in the thickness direction with respect to the plurality of conductive films 51D.

In the present embodiment, the plurality of conductive films 51D configured in this way are formed so as to extend in the longitudinal direction of the electric wire 50. The electric wires 50 including the plurality of conductive films 51D are wound around the teeth portions 23a to 24l to form windings 30A to 30L and 31A to 31L.

As in the first embodiment, the windings 30A to 30L and 31A to 31L are arranged so that the directions of the magnetic flux Ma generated from the magnetic poles 44a to 44l and 45a to 45l intersect in the thickness direction of the conductive film 51.

Therefore, the plurality of insulating layers 53 can suppress the flow of eddy currents flowing in the windings 30A to 30L and 31A to 31L (that is, U-phase windings 32a, V-phase windings 32b, W-phase windings 32c) due to the magnetic flux generated from the magnetic poles 44a to 44l and 45a to 45l.

Third Embodiment

The example of forming the electric wire 50 in which the first plurality of insulating layers 53 are alternately arranged one by one with respect to the plurality of conductive films 51 has been described.

However, instead of this configuration, a third embodiment in which the insulating layers 57a and 57b are provided on one side and the other side in the thickness direction of each of the plurality of conductive films 51A will be described with reference to FIG. 13.

The electric wire 50 of the present embodiment is composed of a plurality of conductive films 51A instead of the plurality of conductive films 51. Similar to the plurality of conductive films 51 of the first embodiment, the plurality of conductive films 51A have a higher conductivity in the longitudinal direction than the conductivity in the thickness direction, and have the conductivity in the longitudinal direction than the conductivity in the width direction.

Figure 13:
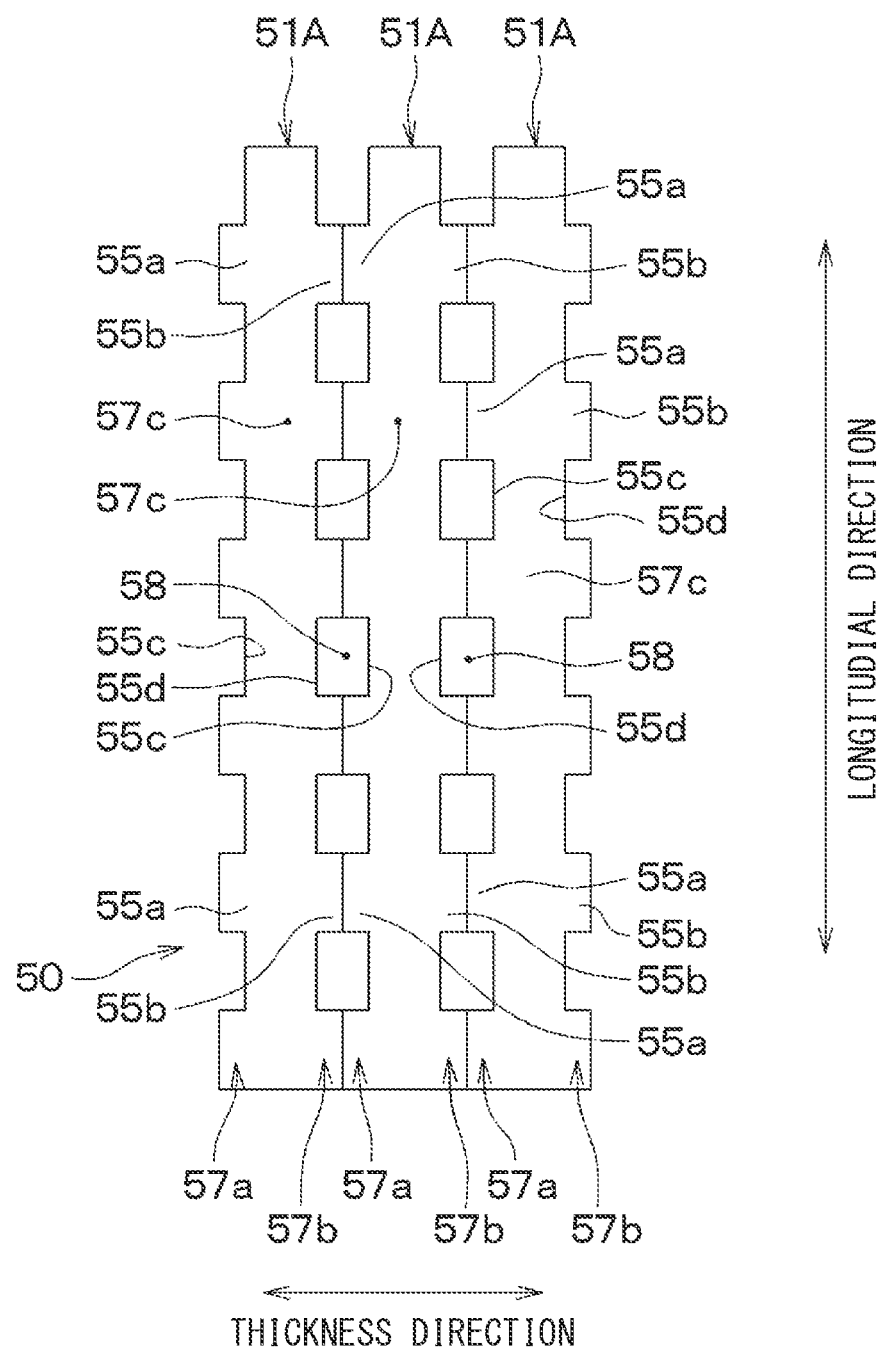
FIG. 13 is a front view showing the structure of the electric wire constituting the winding of a third embodiment, and is a diagram for assisting in explaining the structure of the conductive film constituting the plurality of windings.

As shown in FIG. 13, a plurality of convex portions 55a that are convex on one side in the thickness direction and a plurality of concave portions 55c that are recessed on the other side in the thickness direction are formed on one side of each of the plurality of conductive films 51A in the thickness direction. In the present embodiment, the plurality of convex portions 55a and the plurality of concave portions 55c are alternately arranged one by one in the longitudinal direction of the electric wire 50.

On the other side of each of the plurality of conductive films 51A in the thickness direction, a plurality of convex portions 55b that are convex on the other side in the thickness direction and a plurality of concave portions 55d that are recessed on one side in the thickness direction are provided. In the present embodiment, the plurality of convex portions 55b and the plurality of concave portions 55d are alternately arranged one by one in the longitudinal direction of the electric wire 50.

Of the two adjacent conductive films 51A, the tips of the plurality of convex portions 55b of the conductive film 51A on one side are in contact with the tips of the plurality of convex portions 55a of the other conductive film 51A other than the conductive film 51A on one side, respectively.

A plurality of gaps 58 are formed between the plurality of concave portions 55d of the conductive film 51A on one side and the plurality of concave portions 55c of the conductive film 51A on the other side.

Therefore, the contact area between the two adjacent conductive films 51A can be reduced by the plurality of convex portions 55a and 55b and the concave portions 55c and 55d. Therefore, the plurality of convex portions 55a and the plurality of concave portions 55c form an insulating layer 57a which is an electrically insulating layer that suppresses the flow of current in the thickness direction between two adjacent conductive films 51A.

The plurality of convex portions 55b and the plurality of concave portions 55d form an insulating layer 57b that suppresses the flow of current between two adjacent conductive films 51A.

In each of the plurality of conductive films 51A, an intermediate layer 57c through which a driving current flows is formed between the insulating layers 57a and 57b.

In the present embodiment configured as described above, the windings 30A to 30L and 31A to 31L are arranged so that the magnetic fluxes generated from the magnetic poles 44a to 44l and 45a to 45l intersect in the respective thickness directions.

Here, as in the first embodiment, each of the plurality of conductive films 51A has a higher conductivity in the thickness direction than the conductivity in the longitudinal direction, and a higher conductivity in the width direction than the conductivity in the longitudinal direction.

As described above, in the present embodiment, the windings 30A to 30L and 31A to 31L are formed by the electric wires 50 including the plurality of conductive films 51A.

Therefore, even if the magnetic flux generated from the magnetic poles 44a to 44l and 45a to 45l passes through the windings 30A to 30L and 31A to 31L, it is possible to suppress the flow of eddy currents in the thickness direction and the width direction in the windings 30A to 30L and 31A to 31L due to the magnetic flux.

In the present embodiment, as described above, in each of the plurality of conductive films 51A, insulating layers 57a and 57b are formed on one side in the thickness direction and on the other side in the thickness direction with respect to the intermediate layer 57c.

Therefore, the insulating layers 57a and 57b can further suppress the flow of eddy currents flowing in the windings 30A to 30L and 31A to 31L (that is, U-phase windings 32a, V-phase windings 32b, W-phase windings 32c) due to the magnetic flux generated from the magnetic poles 44a to 44l and 45a to 45l.

Fourth Embodiment

In the first embodiment, the example of forming the electric wire 50 in which the plurality of insulating layers 53 are alternately arranged one by one with respect to the plurality of conductive films 51 has been described.

However, instead of this configuration, a fourth embodiment in which the electric wire 50 is configured to include the conductive film 51C between two conductive films 51 among the plurality of conductive films 51 will be described with reference to FIG. 14.

Figure 14:
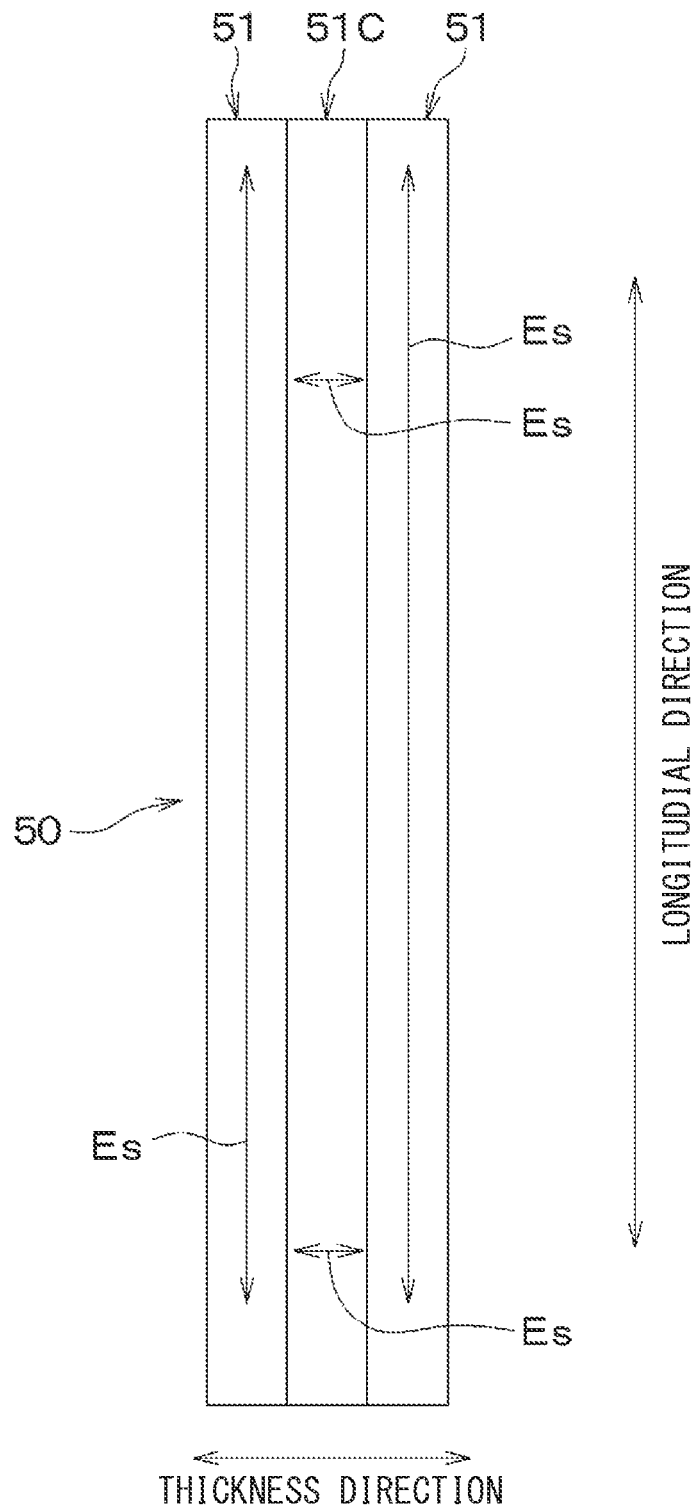
FIG. 14 is a front view showing the structure of an electric wire constituting the winding of a fourth embodiment, and is a diagram for assisting in explaining the structure of the conductive film constituting the plurality of windings.

FIG. 14 shows a part of the electric wire 50 in which the conductive film 51C is arranged between the two conductive films 51.

The two conductive films 51 include a plurality of carbon nanotubes as the first conductive film and the third conductive film, respectively. The plurality of carbon nanotubes are arranged so that their respective extending directions Es are along the longitudinal direction of the electric wire 50. The conductive film 51C is arranged as a second conductive film so that the extension direction Es of each of the plurality of carbon nanotubes are along the thickness direction.

Therefore, in each of the two conductive films 51, more carbon nanotubes among the plurality of carbon nanotubes are arranged along the longitudinal direction in the distribution of the extension direction Es of the carbon nanotubes as compared with in the conductive film 51C.

As a result, the two conductive films 51 have a higher conductivity in the longitudinal direction in comparison with the conductive film 51C. That is, the conductive film 51C has a lower conductivity in the longitudinal direction in comparison with the two conductive films 51.

In addition to this configuration, the two conductive films 51 have a smaller conductivity in the thickness direction in comparison with the conductive film 51C. That is, the conductive film 51C has a higher conductivity in the thickness direction with respect to the two conductive films 51.

As described above, in the present embodiment, the windings 30A to 30L and 31A to 31L are formed by the electric wire 50 including the two conductive films 51 and one conductive film 51C.

In the present embodiment, the two conductive films 51 and the conductive film 51C are arranged so that the directions of the magnetic fluxes generated from the magnetic poles 44a to 44l and 45a to 45l intersect the windings 30A to 30L and 31A to 31L in the respective thickness directions.

In each of the two conductive films 51, the conductivity in the thickness direction is smaller than the conductivity in the longitudinal direction, and the conductivity in the width direction is smaller than the conductivity in the longitudinal direction.

Similar to the first embodiment, it is possible to suppress the flow of eddy currents in the windings 30A to 30L and 31A to 31L (that is, U-phase winding 32a, V-phase winding 32b, W-phase winding 32c) due to the magnetic flux generated from the magnetic poles 44a to 44l and 45a to 45l.

In the present embodiment, the conductive film 51C is arranged between the two conductive films 51. Therefore, the conductive film 51C can function as an electric insulating layer that suppresses a driving current flowing between the two conductive films 51.

Other Embodiments (1) In the first to fourth embodiments, the example in which the rotary machine 1 is a motor generator that operates as either an electric motor or a generator has been described.

However, instead of this configuration, the rotary machine 1 may be operated exclusively as an electric motor without operating as a generator. Alternatively, the rotary machine 1 may be operated exclusively as a generator without operating as an electric motor. That is, the rotary machine 1 may be a dedicated motor machine, or the rotary machine 1 may be a dedicated generator.

Further, the rotor 3 may be a DC generator that generates a current in a plurality of windings by the magnetic flux generated from the plurality of magnetic poles by rotating around the axis Sa. Further, if the rotary machine has a rotor forming a plurality of magnetic poles and a plurality of stator coils, the stepping motor may be used as a rotary machine, not limited to an AC motor or a DC generator.

(2) In the first to fourth embodiments, the rotary machine 1 has 24 (twenty four) magnetic poles such as magnetic poles 44a to 44l and 45a to 45l. However, the number of magnetic poles of the rotary machine 1 is not limited to this configuration, and may be less than 24 magnetic poles or 24 magnetic poles or more as long as the number of magnetic poles is plural.

(3) In the first to fourth embodiments, the rotary machine 1 including the three-phase windings 30A to 30L and 31A to 31L having three phases has been described, but the number of phases of the rotary machine 1 is not limited to this configuration, and may be three phases or less, or four phases or more. That is, when N is 2 or an integer of 4 or more, the N-phase AC rotary machine may be used as the rotary machine 1.

(4) In the third embodiment, an example in which a plurality of conductive films 51A are laminated to form the electric wire 50 has been described. Instead of this configuration, the plurality of electrically insulating layers may be alternately laminated one by one on the plurality of conductive films 51A. The plurality of electrically insulating layers are made of an electrically insulating resin material and play a role of suppressing the flow of current between two adjacent conductive films 51A.

(5) In the fourth embodiment, the electric wire 50 in which the conductive film 51C is arranged between the two conductive films 51 has been described. However, instead of this configuration, a plurality of electrically insulating layers may be alternately laminated one by one on the plurality of conductive films 51 and 51C. That is, in the electric wire 50, the electric insulating layer may be arranged between the adjacent conductive films 51 and 51C.

(6) In the first embodiment, an example in which the conductive film 51 is composed of a plurality of carbon nanotubes has been described. In the second embodiment, an example in which the conductive film 51A is composed of a plurality of carbon nanotubes has been described. In the fourth embodiment, an example in which the conductive film 51C is composed of carbon nanotubes has been described.

However, instead of this configuration, the conductive film may be formed of carbon (for example, graphite or carbon nanowall) other than carbon nanotubes.

(7) In the fourth embodiment, the two conductive films 51 are arranged so that the extending directions Es of the plurality of carbon nanotubes are along the longitudinal direction of the electric wire 50. Further, in the fourth embodiment, the conductive film 51C is arranged so that the extension directions Es of the plurality of carbon nanotubes are along the thickness direction.

However, if the two conductive films 51 have a configuration in which more carbon nanotubes are arranged along the longitudinal direction in the distribution in the extending direction of the carbon nanotubes as compared with the conductive film 51C, it may be configured as follows.

That is, the plurality of carbon nanotubes constituting each of the two conductive films 51 may include carbon nanotubes that intersect in the longitudinal direction. Further, the plurality of carbon nanotubes constituting the conductive film 51C may include carbon nanotubes that intersect in the thickness direction.

(8) In the first to fourth embodiments, an example in which the rotor 3 is arranged radially inside the stator 2 with the axis Sa as the center in the rotary machine 1 has been described. However, instead of this configuration, the rotor 3 may be arranged radially outside the stator 2 with the axis Sa as the center.

Alternatively, in the rotary machine 1, the rotor 3 may be arranged on one side or the other side in the axial direction with respect to the stator 2. In this case, the axis direction is the direction in which the axis Sa extends.

(9) In the first to fourth embodiments, an example in which magnetic poles 44a to 44l and 45a to 45l are formed by permanent magnets 41a to 41l and 42a to 42l has been described. However, instead of this configuration, the magnetic poles 44a to 44l and 45a to 45l may be formed by a plurality of electromagnets instead of the permanent magnets 41a to 41l and 42a to 42l.

(10) In the first embodiment, an example in which a plurality of insulating layers 53 are formed by impregnating the surface of each of the plurality of conductive films 51 on one side in the thickness direction with an electrically insulating resin material has been described.

However, instead of this configuration, when immobilizing a plurality of carbon nanotubes in the form of a film, an electrically insulating fixing agent may be used. In this case, similarly to the plurality of insulating layers 53, the electrical insulation on one side in the thickness direction can be formed in each of the plurality of conductive films 51.

(11) In the first to fourth embodiments, an example in which the U-phase winding 32a, the V-phase winding 32b, and the W-phase winding 32c are star-connected to form the stator coil 32 has been described. However, instead of this configuration, the U-phase winding 32a, the V-phase winding 32b, and the W-phase winding 32c may be delta-connected to form the stator coil 32.

(12) In the first embodiment, an example in which the U-phase winding 32a, the V-phase winding 32b, and the W-phase winding 32c are provided with a plurality of conductive films 51 has been described. However, instead of this configuration, one of the U-phase windings 32a, the V-phase windings 32b, and the W-phase windings 32c may include a plurality of conductive films 51.

(13) In the second embodiment, an example in which the U-phase winding 32a, the V-phase winding 32b, and the W-phase winding 32c are composed of a plurality of conductive films 51D has been described. However, instead of this configuration, one of the U-phase windings 32a, the V-phase windings 32b, and the W-phase windings 32c may include a plurality of conductive films 51D.

(14) In the third embodiment, an example in which the U-phase winding 32a, the V-phase winding 32b, and the W-phase winding 32c are composed of a plurality of conductive films 51A has been described. However, instead of this configuration, one of the U-phase windings 32a, the V-phase windings 32b, and the W-phase windings 32c may include a plurality of conductive films 51A.

(15) In the fourth embodiment, an example in which the U-phase winding 32a, the V-phase winding 32b, and the W-phase winding 32c are composed of a plurality of conductive films 51, 51C has been described. However, instead of this configuration, one of the U-phase windings 32a, the V-phase windings 32b, and the W-phase windings 32c may include a plurality of conductive films 51, 51C.

(16) In the fourth embodiment, an example is described in which the windings 30A to 30L and 31A to 31L are arranged so that the directions of the magnetic fluxes generated from the magnetic poles 44a to 44l and 45a to 45l intersect in the thickness direction, respectively.

However, instead of this configuration, the windings 30A to 30L and 31A to 31L may be arranged so that the directions of the magnetic flux generated from one of the magnetic poles 44a to 44l and 45a to 45l intersect in the thickness direction, respectively.

(17) In the third embodiment, in a plurality of conductive films 51A provided with a plurality of carbon nanotubes, a plurality of convex portions 55a and 55b and a plurality of concave portions 55c and 55d are provided to form the insulating layer 57a.

However, in the plurality of conductive films 51D made of the metal material described in the second embodiment, the plurality of convex portions 55a and 55b and the plurality of concave portions 55c and 55d are provided to form the insulating layer 57a.

(18) In the fourth embodiment, the electric wire 50 has the conductive film 51C between the two conductive films 51. However, in addition to this configuration, the electric wire 50 may be configured by alternately arranging the plurality of insulating layers 53 one by one with respect to the two conductive films 51 and the conductive film 51C.

(19) The present disclosure is not limited to the above-described embodiment, and can be appropriately modified within the scope described in the claims. Individual elements or features of a particular embodiment are generally not limited to that particular embodiment, but, where applicable, are interchangeable and can be used in a selected embodiment, even if not specifically shown or described. The constituent element(s) of each of the above embodiments is/are not necessarily essential unless it is specifically stated that the constituent element(s) is/are essential in the above embodiment, or unless the constituent element(s) is/are obviously essential in principle.

What is claimed is:

1. A rotary machine comprising:
a rotor having a plurality of magnetic poles arranged in a circumferential direction around an axis and rotatably arranged around the axis; and
a stator coil having a multi-phase winding in which an electric wire is wound for each phase, and which is arranged in a circumferential direction,
wherein
when the rotor rotates about the axis, magnetic fluxes generated from the plurality of magnetic poles generate a current in the multi-phase windings, and when a current flows through the multi-phase windings, a rotating magnetic field generated from the multi-phase windings generates a rotational force on the plurality of magnetic poles of the rotor,
when a direction in which each of the multi-phase windings extends is defined as a longitudinal direction, one of the multi-phase windings has a plurality of conductive films extending in the longitudinal direction,
when a direction of intersecting the longitudinal direction and forming a thickness of each of the plurality of conductive films is defined as a thickness direction, the plurality of conductive films are arranged in a state of being laminated in the thickness direction,
the one winding is arranged so that a direction of magnetic flux generated from at least one of the plurality of magnetic poles intersect in the thickness direction,
when a direction intersecting in the thickness direction and intersecting in the longitudinal direction is defined as a width direction,
in each of the plurality of conductive films, a conductivity in the thickness direction is smaller than a conductivity in the longitudinal direction, and a conductivity in the width direction is smaller than the conductivity in the longitudinal direction,
each of the plurality of conductive films has a plurality of carbon nanotubes,
the plurality of conductive films have a first conductive film, a second conductive film, and a third conductive film, and the second conductive film is arranged between the first conductive film and the third conductive film, and
in the first conductive film and the third conductive film, more carbon nanotubes among the plurality of carbon nanotubes are arranged along the longitudinal direction in a distribution in a direction in which the plurality of carbon nanotubes extend, as compared with in the second conductive film.

2. The rotary machine according to claim 1, wherein each of the plurality of conductive films has carbon.

3. The rotary machine according to claim 1, wherein each of the plurality of carbon nanotubes is arranged along the longitudinal direction.

4. The rotary machine according to claim 1, wherein each of the plurality of conductive films is made of a metal material.

5. The rotary machine according to claim 1, wherein each of the plurality of conductive films has the first conductive film and the second conductive film adjacent to each other,
on one side in the thickness direction of the conductive film of one of the first conductive film and the second conductive film, a convex portion that is convex on one side in the thickness direction and a concave portion that is recessed on the other side in the thickness direction are provided, and
a tip of the convex portion is in contact with the other conductive film and a gap is formed between the concave portion and the other conductive film.

6. The rotary machine according to claim 1, wherein the one winding has a plurality of insulating layers formed in a film shape by an electrically insulating material, and
the plurality of insulating layers are alternately arranged one by one with respect to the plurality of conductive films in the thickness direction.

7. The rotary machine according to claim 6, wherein the electrically insulating material is a resin material.

8. The rotary machine according to claim 6, wherein each of the plurality of insulating layers is film having flexibility.

* * * * *